United States Patent [19]

Simpson et al.

[11] Patent Number: 4,849,920
[45] Date of Patent: Jul. 18, 1989

[54] APPARATUS FOR LOCATING AND REPRESENTING THE POSITION OF AN END "1" BIT OF A NUMBER IN A MULTI-BIT NUMBER FORMAT

[75] Inventors: Richard D. Simpson, Carlton, England; Michael D. Asal, Peoria, Ill.

[73] Assignee: Texas Instruments Incorporated, Dallas, Tex.

[21] Appl. No.: 839,004

[22] Filed: Mar. 12, 1986

[30] Foreign Application Priority Data

Mar. 18, 1985 [GB] United Kingdom ............... 86.06948

[51] Int. Cl.$^4$ .......................... G06F 7/00; G06F 15/00
[52] U.S. Cl. ................................................. 364/615.1
[58] Field of Search .................. 364/715, 748, 715.04, 364/715.1

[56] References Cited

U.S. PATENT DOCUMENTS

| | | | |
|---|---|---|---|
| 3,678,259 | 7/1972 | Kyser | 364/715 |
| 4,247,891 | 1/1981 | Flynn et al. | 364/748 |
| 4,631,696 | 12/1986 | Sakamoto | 364/715 |

FOREIGN PATENT DOCUMENTS

| | | | |
|---|---|---|---|
| 0127988 | 12/1984 | European Pat. Off. | 364/748 |
| 2005505A | 9/1978 | United Kingdom . | |

OTHER PUBLICATIONS

*IBM Technical Disclosure Bulletin*, "Circuit to Determined of Reading Zeros in a Binary String", vol. 28 #2, Jul. 1985.

*Primary Examiner*—Gary V. Harkcom
*Assistant Examiner*—Dale M. Shaw
*Attorney, Agent, or Firm*—N. Rhys Merrett; Gary C. Honeycutt; Melvin Sharp

[57] ABSTRACT

The position of an end "1" bit in an input number is detected by applying the inverted bits in parallel to inputs of respective NOR gates (61 to 68), the other inputs of which are connected to the nodes of a chain of dynamic field effect transistors (A1 to A8) along which a "O" is propagated. The coincidence of two O's at the inputs of a NOR gate causes it to produce a "1" output representing the location of the end "1" of the input number. The outputs of the NOR gates (L1 to L8) are connected to the column conductors of an field effect transistor array (LA) which produces on the row conductors array in parallel, inverted, binary coded form a number corresponding to the position of the NOR gate producing a "1" output. The apparatus may be divided into several units (U1 to U4) responsive to adjacent groups of the bits of the input number each producing a representation of the location of the end "1" in its group. The units are coupled together so that a representation from a preceding unit blocks the output of a representation from a subsequent unit.

7 Claims, 1 Drawing Sheet

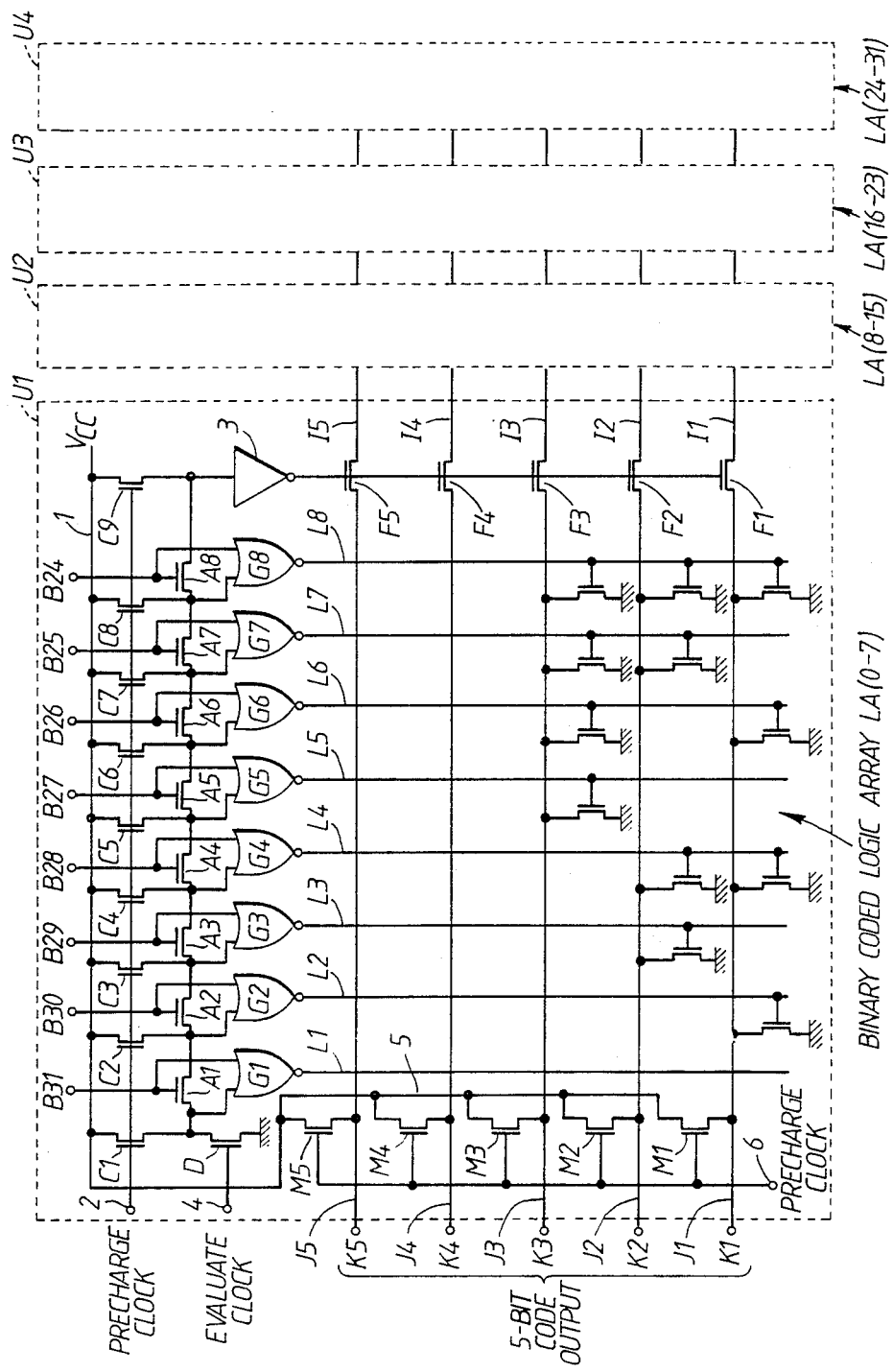

APPARATUS FOR LOCATING AND REPRESENTING THE POSITION OF AN END "1" BIT OF A NUMBER IN A MULTI-BIT NUMBER FORMAT

This invention relates to apparatus for locating and representing the positon of an end "1" bit of a number in a multi-bit number format and is of particular use in providing a representation of the placing of the most significant bit of a multi-bit number e.g. prior to effecting floating point arithmetic operations using the number. In other applications the placing of the least significant "1" bit may need to be known.

In floating point notation a binary number takes the form of a mantissa having a value between 1 and 2 and an exponent representing the power of 2 by which the mantissa is to be multiplied to equal the number represented. Although the use of floating point notation requires the arithmetic circuits of the computer to be complicated by the need to perform operations on both the mantissa and the exponent, it does enable the circuits to handle a much wider range of numbers than they could using fixed point notation. To convert a binary number of floating point notation requires locating the most significant "1" bit of the number, shifting it left or right so that the most significant bit is just to the left of the point and noting the number of places of the shift as the exponent, positive if the shift was to the right and negative if it was to the left. It is clearly desirable to perform the conversion to floating point notation as quickly as possible, and to assist in this an apparatus able to locate the most significant "1" digit and produce a representation of the location rapidly would be useful.

If such apparatus is to be constructed as an integrated circuit or part of such a circuit for use with other units formed using MOS transistor logic, it would be desirable for the apparatus to use the same logic system, both to simplify manufacture and to ensure its compatibility with the other units.

It is an object of the present invention to provide such apparatus which is able to perform its function rapidly and which is suitable for construction as all or part of an integrated circuit. According to the present invention there is provided apparatus for locating and representing the position of an end "1" bit of a number in a multi-bit number format including input terminals for respectively receiving representations of the bits of an input number, a series chain of MOS transistor logic elements equal in number to the bits of the number format and having their gates respectively connected to the input terminals, the logic elements and the representations being such that a logic element is closed by the application of the representation of a "1" bit to its gate, means for setting the inputs and outputs of the logic elements to a first reference potential, means for applying a second reference potential to an end of the series chain, so that a change from the first to the second reference potential is propagated along the chain until it reaches a logic element which is closed because the representation of a "1" bit is applied to it, and logic circuits responsive respectively to the representations applied to the input terminals and to the signals at the outputs of the logic elements to which they are applied to produce a representation where the end "1" bit of the input number occurs.

The apparatus may further include a binary coded logic array responsive to the output representations of the logic circuits to produce binary output signals representing the position of the end "1" bit of the input number.

The apparatus may be divided into several units each responsive to a group of bits forming part of an input number to produce a representation of the position of an end "1" bit in the group, the units being coupled together so that the generation of a representation by a unit is inhibited if such a representation generated by a preceding unit.

In order that the invention may be fully understood and readily carried into effect it will now be described with reference to an embodiment shown in the single FIGURE of the accompanying drawing.

The embodiment of the invention shown in the FIGURE consists of four units U1, U2, U3 and U4, of which only the unit U1 is shown in detail because the other three units are each identical in construction to the unit U1, with the exception that they receive as inputs different groups of 8 bits of the number and use different logic arrays LA. The embodiment operates with a number having 32 bit positions, B31, B30, B29, . . . , B2, B1, B0 in descending order of significance, and is arranged to locate the leftmost, or most significant, "1" bit in the number. Each of the units U1, U2, U3 and U4 has inputs for 8 consecutive bit positions, the unit U1 having inputs for B31, B30, . . . , B25, B24, as shown, the unit U2 having inputs for B23, B22, . . . , B17, B16, the unit U3 having inputs for B15, B14, . . . , B9, B8, and the unit U4 haivng inputs for B7, B6, . . . , B1, B0. The different logic arrays LA use combinations of logic elements representing binary numbers in ascending order from left to right as described below.

The embodiment uses dynamic MOS transistor charge transfer logic.

In the unit U1 each of the inputs B31, B30, . . . , B25, B24 is connected to an input of a respective one of eight NOR gates G1, G2, . . . , G7, G8, and also to the gate of a respective one of eight MOS transistors A1, A2, . . . , A7, A8 having their channels connected in series. The outputs, i.e. the drains, of the transistors A1 to A8 are connected to the second inputs of the NOR gates G1 to G8 respectively. The channels of eight further MOS transistors C1, C2, . . . , C7, C8 are connected respectively from a conductor 1 maintained at a suitable supply potential $V_{cc}$ to the drains of the transistors A1 to A8. Another MOS transistor C9 has its channel connected from the conductor 1 to the source of the transistor A8. The gates of the transistors C1 to C8 and C9 are connected to a terminal 2 to which a "PRECHARGE CLOCK" signal is applied. The drain of the transistor A1 is also connected to ground through the channel of a transistor D, the gate of which receives an EVALUATE CLOCK signal via terminal 4.

The source of the transistors A8 is also connected through an inverter 3 to the gates of five MOS transistors F1, F2, . . . , F5, the channels of which are connected from five input conductors I1 to I5 to five output conductors J1 to J5 respectively. The conductors J1 to J5 are joined to output terminals K1 to K5 and to the outputs L1 to L8 of the NOR gates G1 to G8 through the binary coded array of logic elements LA (0–7). In the array LA (0–7) the leftmost column, that connected to output L1, represents 000 and contains no logic elements. The next column is connected to output L2 and represents 001 and therefore has a single logical element, shown as a transistor connected to ground, linking the output L2 to the conductor J1. In the next column the output L3 has an element linking it to conductor J2 representing 010. The output L4 has elements linking it to both J1 and J2 which represents 011, and so on. Finally, output L8 has 3 elements linking it to J1, J2 and J3 representing 111 (=7). It will be appreciated that the array LA (0–7) has 8 columns of logical elements respectively representing 0 to 7 in binary code. The units U2, U3 and U4 have arrays LA (8–15), LA (16–23) and LA (24–31), each with 8 columns of logical elements and respectively representing 8 to 15, 16–23 and 24–31 in binary code. Each logical element consists of a single MOS transistor with its channel, connected from ground to the particular J conductor and its gate connected to the particular L conductor; it will be appreciated that such a logical element has an inverting effect and serves to ground the J conductor when the L conductor is high.

The conductors J1 to J5 are respectively connected through the channels of transistors M1 to M5 to a conductor 5 held at Vcc, the gates of the transistors being connected to a terminal 6 to which the PRECHARGE CLOCK signal is applied.

Because of the inverting effect of the logical elements and the precharging of the conductors J through the transistors M to a high level ($V_{cc}$) the logic levels set up on the conductors J by a high on one of the conductors L is the complement with respect to 31 ($=2^5-1$) of the binary number represented by the logical elements connected to the particular conductor L. Thus a high on conductor L8 will set up 11000 (=24) on the conductors J and appear at the terminals K.

The conductors joined to the left hand sides of the units U2, U3 and U4 correspond to the conductors J and those joined to the right hand sides of units U2 and U3 correspond to the conductors I. There is no connection to the conductors at the right hand side of the unit U4, and, if desired, the inverter 3 and transistors F1 to F5 may be omitted from this unit.

The operation of the apparatus will now be described. The operation of the unit U1 will be considered first of all, assuming that an 8-bit number is to be applied to the inputs B31, ..., B24. Initially, the EVALUATE CLOCK signal is low so that the transistor D is non-conducting, and the PRECHARGE CLOCK signal goes high for a short period and then falls again, leaving the sources and drains of the transistors A1 to A8 and the conductors J1 to J5 charged to $V_{cc}$. This means that the outputs of the NOR gates G1 to G8 are all low. The 8-bit number is applied to the inputs B31, ..., B24 in inverted form, i.e. a "1" being low and a "0" being high. The EVALUATE CLOCK signal now goes high causing the transistor D to conduct so that the drain of the transistor A1 is discharged to low. This in turn discharges the drain of the transistor A2 if a high representing "0" is applied to the input B31, and so on. The "low" progresses rightwards along the chain of transistor A1 to A8 until it reaches the drian of a transistor to the gate of which a low representing 1 is applied. Suppose it is the transistor A5. This means that the bit applied to the input B27 is the left most "1" of the number and is represented by a low signal. The NOR gate G5 therefore has two low inputs and consequently produces a high output. The outputs of all the other NOR gates are low because they each have at least one high input. Because of the inverting effect of the logical elements of the logic array LA (0–7), the single logical element at the crossover of conductors L5 and J3 causes the conductor J3 to be discharged to low, the other conductors J1, J2, J4 and J5 remaining high. An output of 11011 (=27) is therefore produced at the terminal K and represents that the leftmost "1" bit was applied to the input B27.

It will be apparent from a consideration of the described embodiment that had the leftmost "1" been applied to any other of the inputs B31, ..., B24 then the associated 5-bit binary number would have been produced as output at the terminals K.

Whilst the unit U1 is operating as described above, each of the other units U2, U3 and U4 is operating in the same way to locate the leftmost "1" bit of the group of 8 bits applied to it and to produce a 5-bit binary output on the conductors corresponding to the conductors J of the unit U1. These outputs are not utilised and do not appear as an output of the apparatus as a whole at the terminals K, because they are blocked by the transistors F (and possibly also their counterparts in the units U2 and U3) which remain non-conducting as long as the source of the transistor A8 remains high. On the other hand if none of the bits applied to the inputs B31, ..., B24 is a "1", all of the transistors A1 to A8 will be conducting and the low initiated by the EVALUATE CLOCK signal turning on the transistor D will propagate the whole length of the chain of transistors A1 to A8 and the source of the transistor A8 will become low. If this happens none of the outputs of the NOR gates G will become high so that none of the binary codes in the range 31 to 24, is generated and the transistors F will become conducting enabling a binary output received on the conductors I from one of the units U2, U3 and U4 to be passed to the output terminals K.

The embodiment described can operate quickly to perform its function, not only because the time required to locate the leftmost "1" bit is short as a consequence of the high speed of propagation of the low along the chain of transistors A1 to A8 until it reaches a transistor which is non-conducting because of the "1" bit, but also because the input number is divided into several shorter groups of bits which are examined simultaneously for the leftmost "1" within the groups, so that each low has to propagate along only a short chain of transistors to locate the "1" bit.

Although the invention has been described with reference to only one embodiment, it will be apparent that many modifications could be made to the embodiment without departing from the invention for example, the apparatus could be extended or restricted to receive numbers having a larger or smaller number of bits; there could be only a single group of bits, the number not being divided up as described above. Where the number is divided into several groups of bits, these need not have 8 bits but could have other convenient numbers of bits; in fact, the groups need not have the same numbers of bits. The apparatus could alternatively be arranged to search for the rightmost "1" bit, with the low propagating leftwards along the chain of transistors. The output representing the location of the "1" bit need not be in binary code but could be in another code such as a Gray code, and it could be presented in serial instead of parallel form.

The binary "1" could reprsent "0" if the logic were inverted, and the apparatus used to detect and indicate the location of zeros in a number in any number system, the two binary digits representing zero and non-zero; the apparatus could therefore be of value in a multiplier.

We claim:

1. Apparatus for locating and representing the position of an end "1" bit of a number in a multi-bit number format comprising:
   a plurality of units connected in sequence according to sequential subsets of bits of said multi-bit numbers, each unit including
   input terminals for receiving the representations of the bits of a particular one of said sequential subsets,
   a series chain of field effect logic elements equal in number to the number of bits in said subset of bits of said multi-bit number having gates connected to respective input terminals, each logic element being closed by the application of a representation of a "1" to its gate,
   means for initially setting the inputs and outputs of all said logic elements of all of said plurality of units to a first reference potential,
   means for subsequently applying a seconod reference potential simultaneously to one end of said series chain of logic elements of each of said plurality of units, whereby a change from the first reference potential to the second reference potential is propagated along said series chain of logic elements until it reaches a logic element which is closed,
   a plurality of logic circuits each responsive to the representations of a bit on one of said input terminals and the gate of the logic element associated with that input terminal for generating a representation of whether said bit is a "1", and
   a binary coded logic array having column conductors connected to the outputs of respective logic circuits and having a plurality of row conductors, for generating output signals on said row conductors representing in binary code the bit position of said end "1";
   and in which the binary coded logic arrays of said units are individually connected according to the sequence of said subsets of bits to inhibit generation of an output signal on said row conductors by a particular unit if said binary coded logic array of any other of said units represents a "1" nearer to the beginning of said sequence.

2. Apparatus according to claim 1, wherein said logic elements are field effect logic elements.

3. Apparatus according to claim 2 wherein:
   said setting means includes a plurality of field effect transistors having their source-drain paths connected from a conductor maintained at the first reference potential respectively to the junctions between the logic elements of said series chain of field effect logic elements and to said one end of said series chain, and a connection for applying a precharge clock signal to the gates of said field effect logic elements.

4. Apparatus according to claim 3 wherein:
   said logic circuits are NOR gates, the first reference potential representing a "1", the second reference potential representing a "0", and the representations of the bits of the input number being inversions of the bits represented, so that the NOR gate at the position corresponding to the end "1" bit of the input number produces a "1" output, and all the other NOR gates produce a "0" output.

5. Apparatus according to claim 2 wherein:
   each said binary coded logic array includes a field effect device for each intersection of a column conductor and a row conductor where the binary output digit appearing on the particular row conductor of the output signals representing the particular column conductor as the position of the end "1" bit of the input number is a "0", the source-drain path of said field effect device being connected from the particular row conductor to the second reference potential and the gate of said field effect device being connected to the particular column conductor;
   said apparatus further including means to precharge the row conductors of each of said binary coded logic array to the first reference potential.

6. A method of locating and representing the position of an end "1" bit of a number in a multibit number format having sequential subsets of bits, comprising:
   applying representations of the bits of each subset of bits of an input number as control signals to respective logic elements of an individual series chain of logic elements equal in number to the bits of that subset of bits such that a logic element is closed by application of the representation of a "1" bit as a control signal to that logic element said series chains connected together in a sequence according to the sequence of said subsets of bits;
   initially setting the inputs and outputs of all the logic elements for all said subsets to a first reference potential;
   subsequently, simultaneously changing the potential at one end of each series chain from the first reference potential to a second reference potential to propagate said potential change along each chain until it reaches a logic element which is closed;
   and for each logic element in each chain, detecting the potential at its input and the representation of the input number applied as a control signal to that logic element, to produce an output signal representation of the location of a "1" bit if present in that particular subset, and inhibiting the generation of a said output signal representing the location of a "1" bit from a particular series chain when a "1" bit has been located in the next preceding series chain in said sequence of series chains.

7. A method according to claim 6, wherein said representation of the location of the end "1" bit in the input number is a binary coded representation.

* * * * *